US008915405B2

(12) United States Patent
Sassatelli et al.

(10) Patent No.: US 8,915,405 B2
(45) Date of Patent: Dec. 23, 2014

(54) DOSING APPARATUS

(75) Inventors: Luca Sassatelli, Ozzano Emilia (IT); Claudio Trebbi, Medicina (IT)

(73) Assignee: IMA Life S.R.L. (IT)

( * ) Notice: Subject to any disclaimer, the term of this patent is extended or adjusted under 35 U.S.C. 154(b) by 312 days.

(21) Appl. No.: 13/319,412

(22) PCT Filed: May 4, 2010

(86) PCT No.: PCT/IB2010/051949
§ 371 (c)(1),
(2), (4) Date: Jan. 20, 2012

(87) PCT Pub. No.: WO2010/128455
PCT Pub. Date: Nov. 11, 2010

(65) Prior Publication Data
US 2012/0132318 A1       May 31, 2012

(30) Foreign Application Priority Data

May 8, 2009   (IT) .............. BO2009A0283
Aug. 4, 2009  (IT) .............. BO2009A0521

(51) Int. Cl.
| B65D 88/54 | (2006.01) |
| B67D 7/58  | (2010.01) |
| B67D 7/84  | (2010.01) |
| B65B 43/42 | (2006.01) |
| G01F 11/02 | (2006.01) |
| B65B 1/36  | (2006.01) |
| G01F 11/00 | (2006.01) |
| B65B 3/32  | (2006.01) |
| B65B 3/30  | (2006.01) |
| B65B 3/00  | (2006.01) |
| B65B 59/04 | (2006.01) |

(52) U.S. Cl.
CPC ............. *G01F 11/029* (2013.01); *B65B 1/363* (2013.01); *G01F 11/006* (2013.01); *G01F 11/02* (2013.01); *B65B 3/32* (2013.01); *B65B 3/305* (2013.01); *B65B 3/003* (2013.01); *B65B 59/04* (2013.01)
USPC ........... 222/251; 222/380; 222/167; 222/170; 141/144

(58) Field of Classification Search
USPC ............. 222/380, 168.5, 170, 167, 168, 148, 222/149, 150, 151, 251; 141/144–152
See application file for complete search history.

(56) References Cited

U.S. PATENT DOCUMENTS

| 1,490,923 A | * | 4/1924 | Hansen | ............... 222/168.5 |
| 2,187,615 A | * | 1/1940 | Ayars  | ............... 222/168.5 |

(Continued)

FOREIGN PATENT DOCUMENTS

| EP | 1503713 A1 | 2/2005 |
| FR | 2176333 A  | 10/1973 |
| FR | 2844593 A1 | 3/2004 |

*Primary Examiner* — Kevin P Shaver
*Assistant Examiner* — Stephanie E Williams
(74) *Attorney, Agent, or Firm* — Laubscher & Laubscher PC

(57) ABSTRACT

A dosing apparatus includes a dosing unit provided with a casing for supporting or containing a dosing device and a support device that are associated in particular with a filling machine, for supporting and locking the dosing unit in a mounting configuration. The apparatus further includes a coupling device associated with a casing and slidingly insertable into or disconnectable from a guide of the support device along a first direction. The support device further includes a fixing device for reversibly locking the coupling device to the guide in the mounting configuration.

26 Claims, 8 Drawing Sheets

(56) References Cited

U.S. PATENT DOCUMENTS

| | | | |
|---|---|---|---|
| 2,340,336 A * | 2/1944 | McK. Martin | 141/98 |
| 2,345,617 A * | 4/1944 | McK. Martin | 222/168.5 |
| 2,351,059 A * | 6/1944 | McK. Martin | 222/168.5 |
| 2,466,731 A * | 4/1949 | Nordquist | 141/94 |
| 2,770,397 A * | 11/1956 | Galloway | 222/168.5 |
| 3,175,738 A * | 3/1965 | Wyers et al. | 222/309 |
| 3,227,325 A | 1/1966 | Bates | |
| 3,779,292 A | 12/1973 | Mencacci | |
| 3,850,345 A | 11/1974 | Merritt | |
| 4,055,281 A | 10/1977 | Rosen et al. | |
| 4,244,404 A * | 1/1981 | Brockner et al. | 141/146 |
| 4,326,568 A * | 4/1982 | Burton et al. | 141/114 |
| 4,437,498 A * | 3/1984 | Pankratz et al. | 141/89 |
| 4,565,304 A * | 1/1986 | Dronet | 222/108 |
| 4,993,598 A | 2/1991 | Groninger | |
| 5,348,058 A | 9/1994 | Ruhl | |
| 5,467,899 A * | 11/1995 | Miller | 222/309 |
| 6,237,650 B1 * | 5/2001 | Ansaloni | 141/237 |
| 6,378,737 B1 * | 4/2002 | Cavallaro et al. | 222/309 |
| 7,156,262 B2 * | 1/2007 | Navarro | 222/256 |
| 8,256,474 B2 * | 9/2012 | Stienen | 141/144 |
| 8,381,777 B2 * | 2/2013 | Lupi et al. | 141/48 |
| 2006/0144849 A1 | 7/2006 | Bezema et al. | |
| 2007/0125808 A1 | 6/2007 | Monti | |

\* cited by examiner

DOSING APPARATUS

This application is a §371 national phase entry of PCT International Application No. PCT/IB2010/051949 filed May 4, 2010. PCT/IB2010/051949 claims priority to IT Application No. BO2009A000283 filed May 8, 2009 and to IT Application No. BO2009A000521 filed Aug. 4, 2009. The entire contents of these applications are incorporated herein by reference.

BACKGROUND OF THE INVENTION

The present invention relates to an apparatus and a dosing unit associated with an automatic filling machine for dispensing preset and precise quantities of product into containers, such as bottles, vials, ampoules and the like.

In the pharmaceutical, cosmetic and food fields, it is known to use filling machines for filling different types of dosing devices as a function of the products to be dosed.

In the case of fluid products, volumetric piston pumps, peristaltic pumps, diaphragm pumps, time-pressure dosing systems, flow-meter dosing systems, and mass flowrate meter dosing systems are generally used.

The choice of dosing devices depends on a plurality of factors such as the chemical and physical features of the product to be dosed, dosing volumes, dosing precision and accuracy, and the hygiene and sterility requirements of the filling process. For example, in the case of liquid products that must not come into contact with the pump components, typically to avoid contamination, peristaltic pumps or diaphragm pumps or time-pressure dosing systems are used. In the case of more dense and/or viscous liquid products, piston pumps are preferable.

Filling machines can also be provided with dosing devices for powder or granule products.

The aforementioned dosing devices are driven by a movement mechanism, generally housed inside the filling machine. The movement mechanism provides the required movement, typically a rotational and/or a linear movement, to a dosing device. The dosing device and the movement mechanism are connected by an operating assembly including driving shafts and pistons.

In volumetric piston pumps the dosing device includes a piston driven linearly by the movement mechanism with reciprocating motion inside a dosing chamber so as to draw and subsequently dispense a defined volume of liquid product. In pumps in which the piston also acts as the switching valve, the piston is further rotated by the movement mechanism around the longitudinal axis thereof to make the dosing chamber communicate alternately with a supply conduit and with a delivery conduit.

In pumps in which the piston also acts as the switching valve, the piston is further rotated by the movement mechanism around the longitudinal axis thereof to make the dosing chamber communicate alternately with a supply conduit and with a delivery conduit.

In diaphragm pumps, the dosing device includes an elastic membrane that closes a dosing chamber and is moved linearly with reciprocating motion by the movement mechanism by a driving shaft. In peristaltic pumps, the dosing device includes a rotor that is rotated continuously by a respective driving shaft by the movement mechanism so as to squeeze a flexible tube in which the fluid is located. By squeezing the tube alternately, the fluid advances in the interior thereof.

In dosing devices for powder products, the dosing device includes a dosing drum or wheel rotated with reciprocating motion by the movement mechanism by a respective driving shaft.

The dosing devices are fixed to the filling machines by appropriate supporting structures that also enable connection to the movement mechanism. Known supporting structures ensure precise and solid support for the dosing devices, but entail laborious and complex mounting and dismantling procedures for which specialized operators are required. Such procedures are even more complex and inconvenient if the dosing devices are associated with filling machines operating in an aseptic or sterile environment and thus provided with a sealed housing which enable the processing zone in which the product is packed to be accessed only through openings provided with gloves (i.e., gloveports).

As each dosing device requires a specific supporting structure, possible replacements of dosing devices of one type with devices of another type are not generally possible in the same filling machine or are possible only after complicated and long reconfiguration operations.

In order to provide a certain production flexibility, some filling machines are provided with a plurality of different dosing devices that can be selectively used according to the product to be dosed. Such machines are nevertheless very complex and expensive.

One drawback of known dosing devices is the fact that the operating assembly of the dosing device, i.e. the driving shafts and the pistons, once it has been disengaged from the movement mechanism—for example during conveying or during mounting/dismantling of the device—remains unconstrained and is free to move rotationally and/or linearly, thus allowing uncontrolled and undefined movement of the dosing device. In one step of mounting the dosing device on the filling machine, adjusting and/or calibrating steps for the dosing device and/or for the movement mechanism are thus necessary, which procedures are generally very laborious and time-consuming.

In the case of volumetric dosing pumps, once the piston has been detached from the movement mechanism, it may even disengage from and exit the dosing chamber with the risk of becoming damaged or dirty. As the piston has to be maintained manually inside the dosing chamber, the procedures for assembling and dismantling known volumetric dosing pumps are particularly complex and long, requiring the use of at least two specialized operators.

SUMMARY OF THE INVENTION

One object of the present invention is to improve the devices and dosing units that are associated with filling machines.

Another object is to make a dosing apparatus including a dosing unit and a supporting and locking device that is associated with a filling machine to enable the dosing unit to be mounted and dismantled easy and fast, for example, to permit replacement with a dosing unit that is similar or of another type.

A further object is to make a dosing apparatus including a dosing unit and a supporting and locking device that ensures precise and firm positioning of the dosing unit in a mounting operating configuration.

Still another object is to make a dosing apparatus including a dosing unit arranged for automatically being connected to or disconnected from a movement mechanism provided in the filling machine without requiring the manual intervention of an operator.

Another object is to make a dosing unit including a casing or housing for supporting and/or containing a dosing device, the latter being provided with an operating assembly that can be locked to the casing in a preset linear and angular position to prevent it from being accidentally detached from the aforementioned casing and at the same time being able to maintain the dosing device fixed in a desired position.

Owing to the dosing apparatus of the invention it is possible to hook and lock a dosing unit, in a rapid, precise and firm manner, to a respective support device that is associated in particular with a filling machine. At the same time it is possible to connect the dosing unit to a movement mechanism of the machine in a completely automatic manner without requiring the manual intervention of an operator with reduced downtime and less risk of error in mounting. The mounting procedure can be performed by just one operator and is made particularly easy by the shape and dimensions of a guide of the support device and by a coupling device of the dosing unit. A fixing device of the support device, driven by a pushing device, further enables the dosing unit to be locked automatically and without intervention by the operator when the dosing unit has reached the desired position. The procedure for dismantling the dosing unit from the support device is similarly easy and rapid, the procedure involving extracting the coupling device manually from the guide.

Owing to the dosing unit of the invention provided with a casing that is suitable for supporting and/or containing a dosing device provided with an operating assembly that is linearly drivable along, and/or rotatably drivable around, a first axis, it is possible to lock the dosing device in a reversible manner in a defined linear and angular position and to maintain the dosing unit in an assembled condition. In particular, a stop assembly with which the dosing unit is provided enables the operating assembly which includes pistons in the case of volumetric dosing pumps, or driving shafts in the case of peristaltic pumps, diaphragm or membrane pumps, volumetric dosers for powders or granules, to be locked.

The stop assembly includes a stop pin that is slidingly mounted in a first housing made in the casing and is movable so as to engage in the assembled condition a second housing made in the operating assembly. The stop pin can be automatically driven by a driving device of the filling machine, or manually by an operator.

It should be noted that the stop assembly maintains the operating assembly constrained to the dosing device, thus preventing accidental and undesired detachments of the operating assembly (for example of the piston in the case of a volumetric pump or of the driving shaft in the case of a peristaltic pump). In this manner, procedures for mounting and dismantling the dosing unit are simplified and can be performed by just one operator. The latter can in fact support the dosing unit by a gripping portion of the casing and fix or dismantle the dosing unit to or from the filling machine without worrying about also supporting the operating assembly, for example the pistons, as usually occurs in known volumetric pumps.

As the dosing device is maintained by the stop assembly in the assembled condition in a defined angular and/or linear position, it is not necessary to perform laborious adjusting and/or calibrating procedures when mounting and starting up the dosing device on the filling machine, as usually occurs in known dosing units. It is further possible to connect the dosing unit automatically to the movement mechanism by the operating assembly.

BRIEF DESCRIPTION OF THE FIGURES

The invention can be better understood and implemented with reference to the attached drawings that illustrate a non-limiting embodiment thereof by way of example in which.

DETAILED DESCRIPTION

Figure 1:
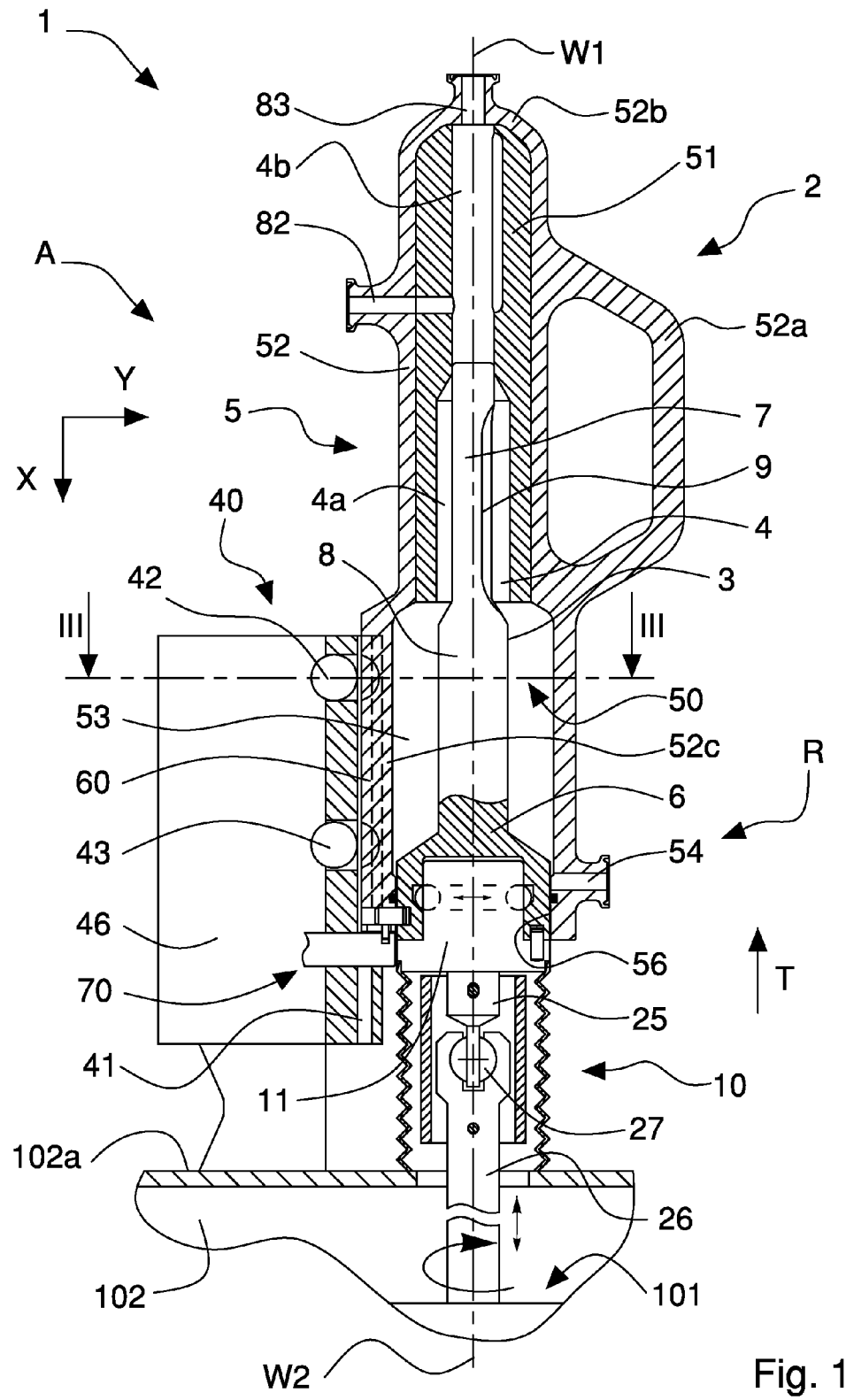
FIG. 1 is a partially sectioned front view of the dosing apparatus of the invention in a mounting configuration.
Figure 2:
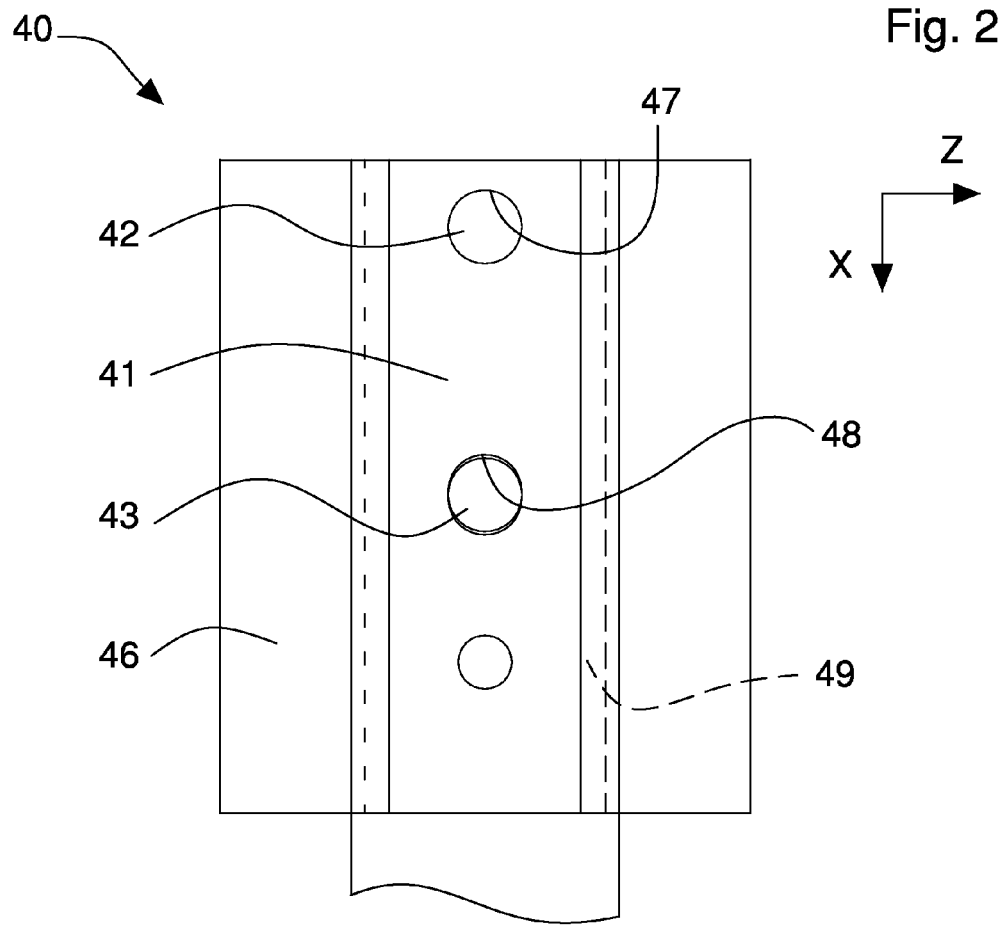
FIG. 2 is a partial side view of a support device of the apparatus in FIG. 1.

With reference to FIGS. 1 to 4, a dosing apparatus 1 is illustrated that is associated with a filling machine and includes a dosing unit 2 and a support device 40 arranged for supporting and locking the dosing unit 2 in a mounting configuration A. In particular, the support device 40 is fixed, for example, to an external wall 102a of a base 102 of the filling machine.

The dosing unit 2 includes a dosing device 50 for dispensing set quantities of product, in particular pharmaceutical product, into containers and a casing 5 arranged for supporting and/or containing the dosing device 50 and removably connecting the dosing unit 2 to the support device 40. The dosing device 50 is provided with an operating assembly 3 that is connectable to a movement mechanism 101 of the filling machine.

The dosing device may include any of the numerous known dosing devices and systems used in the pharmaceutical or foodstuff field, such as, by way of non-limiting example, volumetric piston pumps, peristaltic pumps, diaphragm or membrane pumps, time-pressure dosing systems, flow-control dosing systems, flowrate-meter dosing systems, volumetric dosers for powders, and the like.

In the embodiment illustrated in FIGS. 1 to 4, the dosing device 50 includes, in particular, a volumetric pump in which the operating assembly includes a piston 3 that is linearly movable along and rotatably movable around a first longitudinal axis W1 inside a dosing chamber 4 of the casing 5 for drawing a desired quantity of liquid from an inlet 82 of the casing 5 and directing the quantity of liquid to an outlet 83 of the casing 5.

The apparatus 1 further includes a joint 10 for removably connecting a first end portion 6 of the piston 3 to the movement mechanism 101 arranged for moving the piston 3 linearly and rotationally in the mounting configuration A.

The first end portion 6 of the piston 3 is the lower end portion, the dosing unit 2 thus being driven from below by the movement mechanism 101.

The piston 3 is of the piston-valve type and includes a second end portion 7 that is opposite the first end portion 6, that is slidable inside the dosing chamber 4 and provided with a switching device 9 that makes the dosing chamber 4 communicate with the inlet 82 or with the outlet 83. The piston 3, driven by the movement mechanism 101, is movable with reciprocating linear motion along the first axis W1 between a retracted or internal position and an extended or external position and is movable with a rotatable motion around the first axis W1, between a suction position in which the switching device 9 makes the dosing chamber 4 communicate with the inlet 82 and a delivery position in which the switching device 9 connects the dosing chamber 4 with the outlet 83.

The casing 5 includes an internal tubular element 51 having a substantially cylindrical shape inside which the dosing chamber 4 is made and an external covering element 52 that envelops the internal tubular element 51 and extends below the internal tubular element 51 so as to form a lower cavity 53, provided with a respective opening 56 to enable the joint 10 to pass through. The covering element 52 further includes a handle-shaped gripping portion 52a to enable the dosing unit 2 to be gripped and handled easily by an operator, in particular during the mounting/dismantling step as explained below.

The dosing chamber 4 has a substantially cylindrical shape and extends longitudinally over the entire length of the internal tubular element 51. The dosing chamber 4 includes a lower dosing chamber 4a and an upper dosing chamber 4b having different diameters and lengths. In particular, the lower dosing chamber 4a has a greater diameter than the upper dosing chamber 4b. The upper dosing chamber 4b is flowingly connected with a supply circuit of the product to be dosed by the inlet 82, which consists of a conduit made on side walls of the internal tubular element 51 and of the covering element 52. The upper dosing chamber 4b is further flowingly connected with a delivery circuit for delivering the product by the outlet 83, consisting of a respective conduit made on a top portion 52b of the covering element 52 that closes above the dosing chamber 4, the respective hole being substantially coaxial with the first longitudinal axis W1.

The piston 3 includes an elongated cylindrical portion that includes an intermediate portion 8 between the first end portion 6 and the second end portion 7, the portions together being coaxial with the first axis W1 and having different diameters and lengths. The intermediate portion 8 is arranged for sealingly sliding inside the lower dosing chamber 4a, while the second end portion 7 is arranged for sealingly sliding inside the upper dosing chamber 4b.

The first end portion 6 slides with clearance inside the cavity 53. The first end portion 6 of the piston 3 includes a seat 16 configured for removably receiving a clutch portion 11 of the joint 10, the clutch portion 11 being insertable into and disconnectable from the seat 16 along a coupling direction T that is substantially parallel to the first axis W1. The clutch portion 11 and the seat 16 have a complementary shape, for example cylindrical, and have dimensions that minimize a residual radial clearance.

The joint 10 includes a connecting element 25 that includes the clutch portion 11, and a further connecting element 26 an end portion of which is connected to the movement mechanism 101. The connecting element 25 and the further connecting element 26 are rotatably connected by a spherical element 27. The further connecting element 26 is moved by the movement mechanism 101 along and around a second axis W2. In use, the joint 10 is normally assembled on the movement mechanism 101.

Figure 5:
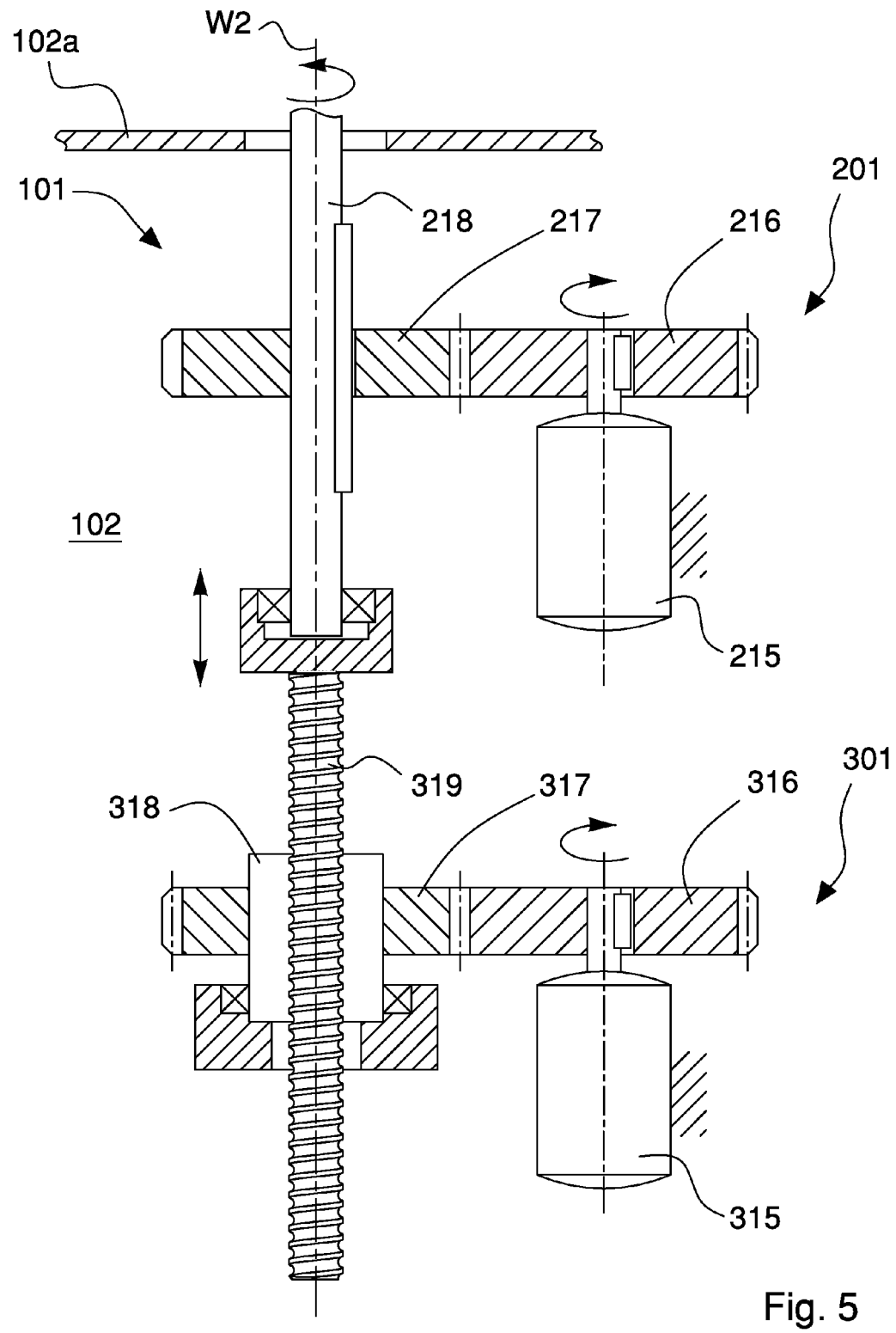
FIG. 5 is a schematic and partially sectional front view of a movement mechanism of the dosing unit.

With particular reference to FIG. 5, the movement mechanism 101 is contained inside the base 102 of the filling machine and includes a first movement mechanism 201 arranged for rotating the piston 3 and a second movement mechanism 301 arranged for linearly moving the piston 3. More precisely, the first movement mechanism 201 and the second movement mechanism 301 are connected to the further connecting element 26 of the joint 10, the further connecting element 26 being rotated around and/or moved along the second axis W2 that substantially coincides with the first axis W1. The joint 10 is nevertheless shaped to ensure correct transmission of motion from the movement mechanism 101 to the piston 3 even if the first axis W1 is misaligned or tilted with respect to the second axis W2, due for example, to imprecisions in mounting or in manufacturing of the dosing unit 2 or of the support device 40.

In the embodiment illustrated in FIG. 5, the first movement mechanism 201 includes a first motor 215 that rotates a driving shaft 218 connected to the further connecting element 26 of the joint 10 via a pair of toothed wheels 216, 217.

The driving shaft 218 is further moved linearly along the second axis W2 by the second movement mechanism 301 including, for example, a second motor 315 that rotates by a pair of further toothed wheels 316, 317 and a nut 318 of a lead-screw unit. The rotation of the nut 318 causes the corresponding screw 319 that is connected to the movement shaft 218 to move linearly.

A coupling device 60 is associated with a casing 5 and is arranged for slidingly engaging in a guide 41 of the support device 40 in the mounting configuration A of the dosing unit 2.

The coupling device 60 is insertable into, or disconnectable from, the guide 41 along a first direction X that is substantially parallel to the first axis W1. The first direction X is, for example, vertical and substantially orthogonal to the upper wall 102a of the base 102 of the filling machine to which the support device 40 can be fixed.

In a version of the apparatus 1 that is not illustrated, the first direction X may be horizontal and substantially orthogonal to the first axis W1.

The support device 40 includes a supporting body 46 fixed to the upper wall 102a and supporting the guide 41. The latter includes a guiding element having a flat shape and being provided with a rectilinear groove 49 (visible in FIG. 3) that has a "T" cross section and extends parallel to the first direction X.

The coupling device includes a coupling element 60 that is fixed to the casing 5 and is "T"-shaped so as to slidingly engage in the rectilinear groove 49 with a preset clearance to enable the dosing unit 2 to be easily mounted on and dismantled from the support device 40. The coupling element is, for example, made directly on a side wall of a lower cylindrical portion 52c of the covering element 52. Alternatively, the coupling element 60 can be a distinct element and be fixed to the side wall of the lower cylindrical portion 52c.

The support device 40 further includes a fixing device 42, 43 arranged for reversibly locking the coupling element 60 on the guide 41. The fixing device includes at least a first fixing element 42 and a second fixing element 43 that are associated with the guide 41 and are movable so as to engage with or disengage from respective coupling notches 62, (visible in FIG. 4) of the coupling element 60, respectively, for locking or releasing the coupling device on or from the guide 41.

A pushing device 44, 45 is provided for acting on the fixing elements 42, 43 and pushing the latter to abut against the coupling notches 62, 63 with a preset fixing force along a second direction Y that is substantially orthogonal to the first direction X.

With reference to the embodiment illustrated in the figures, the fixing device includes a first fixing element 42 and a second fixing element 43 having a spherical shape and inserted respectively into a first opening 47 and into a second opening 48 that are aligned and overlapped with respect to the first direction X in the guide 41. The first fixing element 42 and the second fixing element 43 are maintained in a protruding configuration by the pushing device 44, 45 so as to engage, respectively, the first coupling notch 62 and the second coupling notch 63 of the coupling element 60 in the mounting configuration A.

The pushing device includes an actuating device, in particular a first actuator 44 and a second actuator 45, for example of the pneumatic or mechanical type, that are connected respectively to the first fixing element 42 and to the second fixing element 43. By activating the actuators 44, 45, it is possible to place the fixing elements 42, 43 alternately in the retracted position or in the protruding position, in which the fixing force is applied by the fixing elements 42, 43 to the coupling notches 62, 63.

Figure 3:
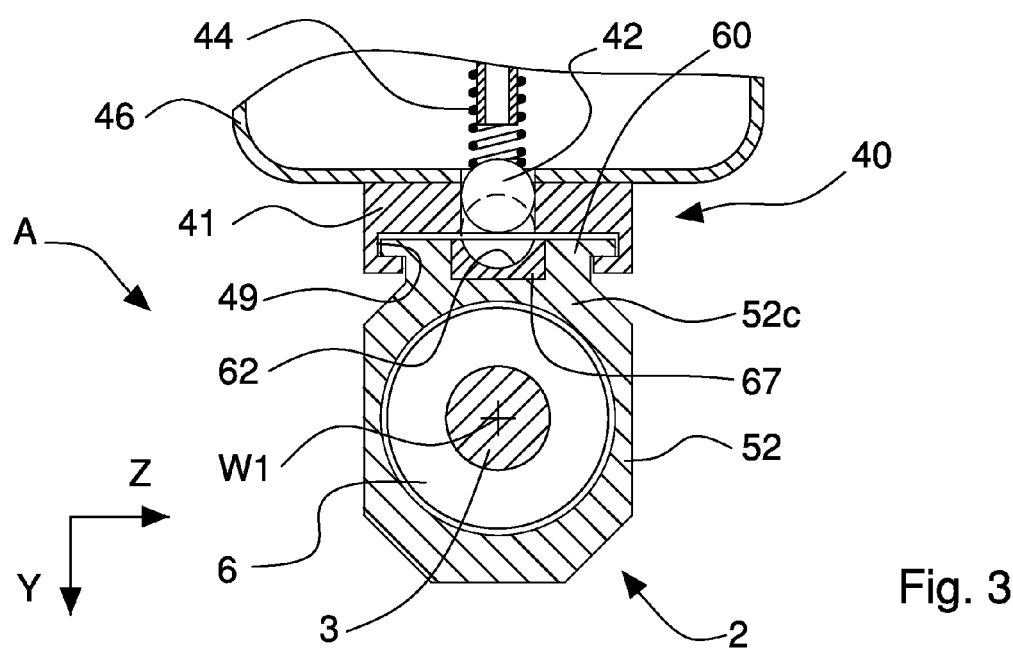
FIG. 3 is a partial section taken along line III-III in FIG. 1.
Figure 4:
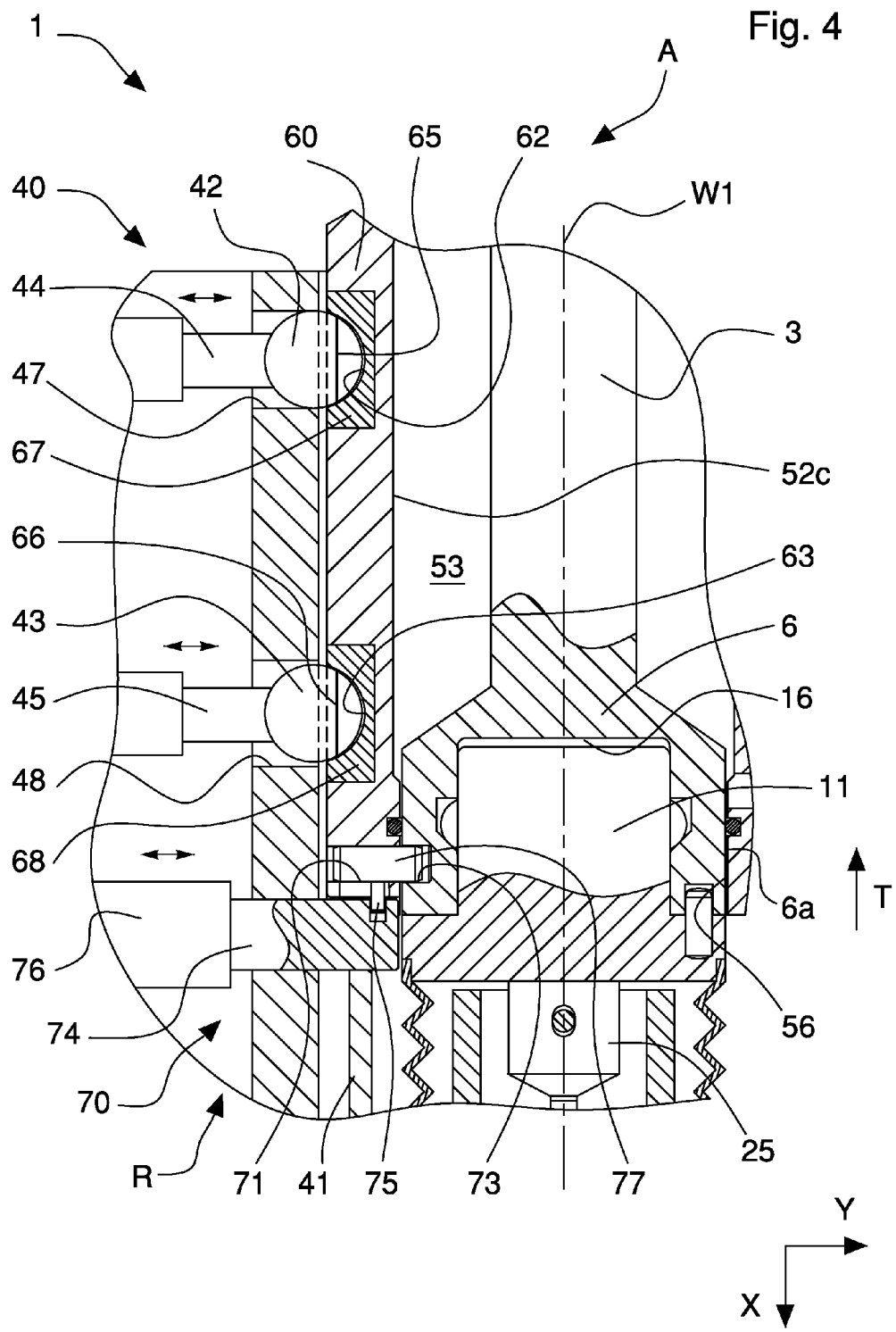
FIG. 4 is a partial and enlarged view of the apparatus in FIG. 1, showing a dosing unit associated with a support device in the mounting configuration.

The actuators may further include, as illustrated in FIG. 3, a first elastic element 44 acting on the first fixing element 42 and a second elastic element 45 acting on the second fixing element 43. The first elastic element 44 and the second elastic element 45 comprise, for example, respective coil springs.

The first opening 47 and the second opening 48 are provided with stop portions that are not illustrated in the figures, to prevent the fixing elements 42, 43 from completely exiting from the opening 47, 48, i.e. to enable the fixing elements 42, 43 to protrude by a preset amount.

The coupling notches 62, 63 have a spherical cap shape with a curvature radius that is less than the curvature radius of the fixing elements 42, 43 such as to make the latter abut along respective substantially annular contact surfaces 65, 66.

The first opening 47 includes a cylindrical hole having a diameter that is such as to house the first fixing element 42 with a very reduced radial clearance.

When the first fixing element 42 abuts on the first coupling notch 62 and pushes the coupling element 60 against the rectilinear groove 49 along the second direction Y, the dosing unit 2 is locked in a firm and precise manner, prevented from moving in the first direction X, in the second direction Y and in a third direction Z orthogonal to the first direction X and to the second direction Y. The second opening 48 on the other hand includes a through slot that is elongated in the first direction X to enable the second fixing element 43 to be adapted to the position of the second coupling notch 63 and to compensate for variations in distance between the latter and the first coupling notch 62 along the first direction X. When the second fixing element 43 abuts on the second coupling notch 63 and pushes the coupling element 60 against the rectilinear groove 49, the rotation of the dosing unit 2 around an axis that is parallel to the direction Y and passes through at the first fixing element 42 is also locked.

The first coupling notch 62 and the second coupling notch 63 are made in corresponding inserts 67, 68 of metallic material incorporated into the coupling element 60 to ensure greater stiffness and nondeformability for the coupling notches 62, 63 and greater precision and resistance in abutment with the fixing elements 42, 43.

The dosing unit 2 further includes a stop assembly 70 arranged for preventing or enabling the piston 3 to slide inside the dosing chamber 4 along the first axis W1. In particular, the stop assembly 70 locks the piston 3 with respect to the casing 5 in a preset linear and angular position, so as to maintain the dosing unit 2 in an assembled condition R that is necessary for conveying and for mounting on and dismantling the dosing unit 2 from the joint 10.

The stop assembly 70 includes, in particular, a stop pin 77 that is slidingly mounted in a first housing 71, which is made on a side wall of the lower cylindrical portion 52c of the covering element 52 and arranged for engaging a second housing 73, obtained on an external wall 6a of the first end portion 6 of the piston 3, at the opening of the seat 16.

The first housing 71 is made at the opening 56 of the cavity 53, adjacent to the coupling element 60 and facing the guide 41.

The second housing 73 includes a hole having dimensions that are substantially equivalent to those of the stop pin 77.

The stop pin 77 is movable parallel to the second direction Y, i.e., perpendicular to the first axis W1 and is moved by a driving device 76 associated with a support device 40 between a retracted position and an extended position. In the retracted position the stop pin 77 is contained completely in the first housing 71, so as not to interact with the first end portion 6 and to enable the piston 3 to be moved. In the extended position, the stop pin 77 is inserted into the second housing 73 and prevents the piston 3 from moving along, and rotating around the first axis W1, determining the assembled condition R of the dosing unit 2.

A driving pin 75, fixed transversely to the stop pin 77, is engaged by a driving stem 74 of the driving device 76. The driving stem 74 is parallel to the stop pin 77 and is driven by a linear actuating device, including for example a pneumatic cylinder. The driving stem 74 is provided with a respective radial groove that is suitable for receiving the driving pin 75.

In an embodiment of the dosing unit 2 which is not illustrated in the figures, the first housing 71 is made on a side of the lower cylindrical portion 52c that is opposite the coupling element 60 and opposite the guide 41 to enable an operator to drive the stop pin 77 manually between the extended position and the retracted position and thus lock or unlock the piston 3. In this embodiment, the second housing 73 is made on the external wall 6a of the first end portion 6 and faces the first housing 71.

In a mounting step of the dosing unit 2 to the support device 40, the operator supports the dosing unit 2 arranged in the assembled condition R by the gripping portion 52a and inserts the coupling element 60 inside the guide 41 along the first direction X. The clearance existing between the coupling element 60 and the rectilinear groove 49 of the guide 41 permits easy and rapid insertion of the coupling element.

With the fixing elements 42, 43 maintained in a retracted position by the respective actuators 44, 45 inside the respective openings 47, 48, the coupling element 60 slides inside the guide 41 until it reaches a final position in which the fixing elements 42, 43, pushed by the respective actuators 44, 45 into a protruding position, abut on the respective coupling notches 62, 63, locking the dosing unit 2 in position in the mounting configuration A. In this configuration, the driving pin 75 of the stop pin 77 is housed in the radial groove of the driving stem 74. By performing the operation in the opposite manner, i.e. by extracting the coupling element 60 from the guide 41, with the fixing elements 42, 43 in a retracted position owing to the respective actuators 44, 45, it is possible to dismantle the dosing unit 2 from the support device 40.

Once the dosing unit 2 has been inserted into the support device 40, the stop pin 77 still maintains the piston 3 fixed to the casing 5, locked in the assembled condition R in a preset linear and angular position, to enable the movement mechanism 101 to move the joint 10 along the second axis W2 until the clutch portion 11 is inserted into the seat 16 of the first end portion 6.

Once the clutch portion 11 has been inserted into the seat 16, the stop pin 77 is disengaged from the piston 3. In particular, the driving device 76 is activated to move the stop pin 77 in the retracted position to enable the piston 3 to move freely.

In one version of the apparatus which is not illustrated in the figures, the stop pin 77 is engaged in a third housing made in the guide 41, to prevent the coupling element 60 from sliding, i.e. the dosing unit 2 from being extracted from the support device 40.

Owing to the dosing apparatus 1 of the invention, it is thus possible to hook and lock the dosing unit 2 rapidly, easily and at the same time precisely and firmly to and from the support device 40. It is important to note that the mounting procedure can be performed by just one operator and is made particularly easy by the shape and the dimensions of the guide 41 and of the coupling device 60, which are provided with clearance. The fixing elements 42, 43 driven by the respective actuators 44, 45 further enable the dosing unit 2 to be locked automatically when it has reached the desired position.

The entire mounting operation is made even easier by virtue of the stop assembly 70 that, in the assembled condition R, fixes the piston 3 to the casing 5. In this manner the operator can support the dosing unit 2 by the gripping portion 52a and insert the coupling element 60 inside the guide 41 along the first direction X without worrying about supporting the piston 3 as usually occurs in known volumetric piston pumps. It should be noted also that also disengagement of the stop assembly 70 from the piston 3, to enable the piston 3 to be moved in the dosing chamber 4, occurs automatically by operation of the driving device 76. The procedure of dismantling the dosing unit 2 from the support device 40 is similarly easy and rapid and occurs by manually extracting the coupling device 60 from the guide 41 along the first direction X.

It should be observed that the stop assembly 70, by locking the piston 3—and thus the dosing device 50—in a defined linear and angular position in the assembled condition, in addition to preventing accidental and undesired detachments of the piston 3, enables laborious adjusting or calibrating procedures to be avoided in a mounting and start up step, as usually occurs in known dosing units. It is further possible to connect the piston 3 to the joint 10 automatically.

Figure 6:
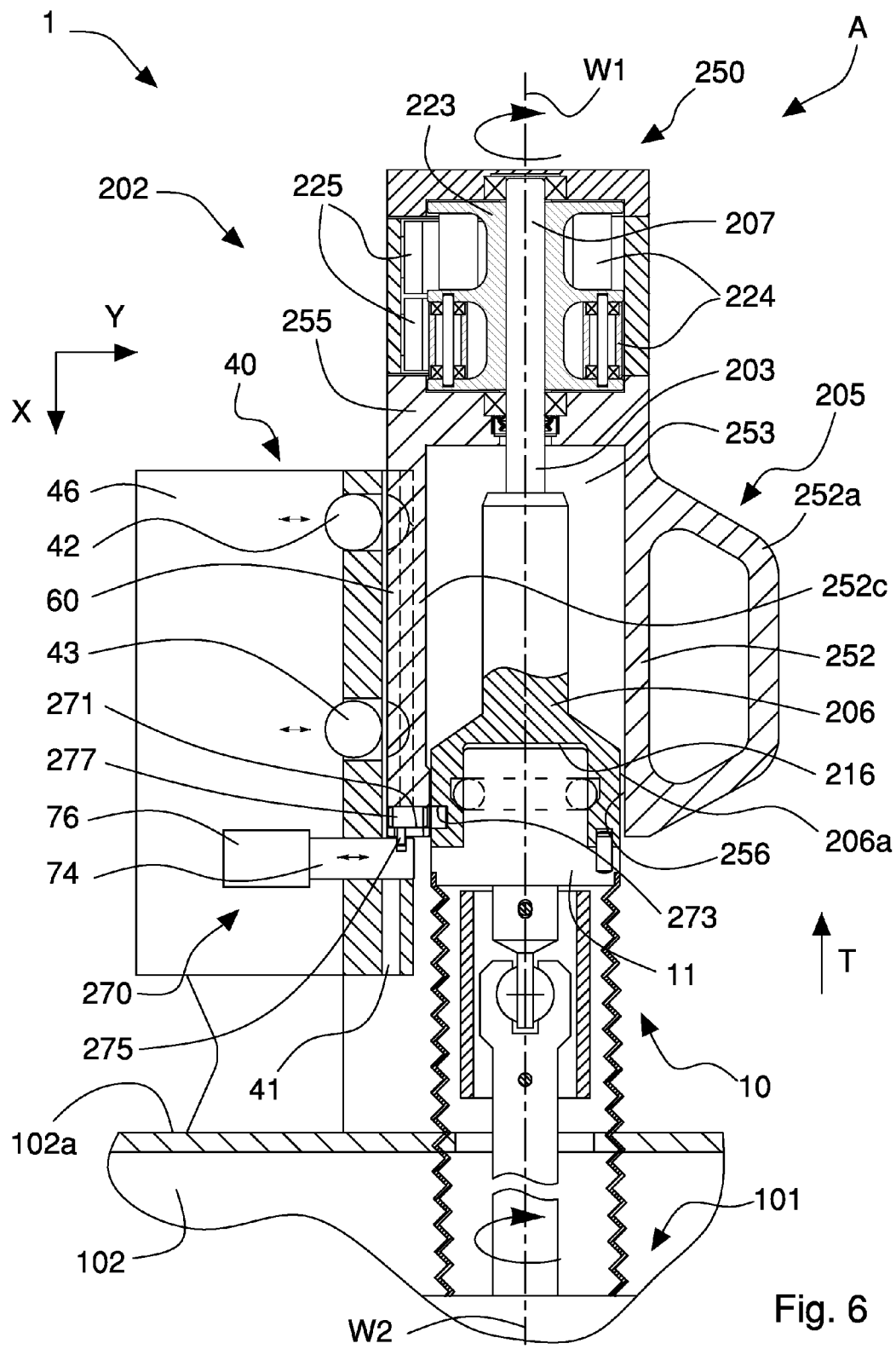
FIG. 6 is a partially sectional front view of another embodiment of the dosing apparatus.

FIG. 6 illustrates an embodiment of the dosing apparatus 1 of the invention that differs from the embodiment disclosed above only for the dosing unit 202 that includes a dosing device 250 including a peristaltic pump, of known type, rotated by an operating assembly 203 including a driving shaft that is rotatably movable around the first axis W1 and is removably connected to the movement mechanism 101 by the joint 10. In particular, in the mounting configuration A of the dosing unit 202 to the support device 40, a first end portion 206 of the shaft 203 is connected to the movement mechanism 101, while a second end portion 207 of the shaft 203, which is opposite the first end portion 206, is connected to the peristaltic pump 250. The latter includes a rotor 223 that is mounted on the second end portion 207 and provided with rollers 224 arranged to squeeze one or more dosing tubes 225 for dosing the product.

During operation, the shaft 203, which is rotated around the first axis W1 by the movement mechanism 101, rotates the rotor 223, the rollers 224 of which squeeze the tubes 225 in which the fluid product is present, causing the fluid product to be dispensed into the containers. The first end portion 206 of the shaft 203 includes a seat 216 configured for removably receiving the clutch portion 11 of the joint 10, the clutch portion 11 being insertable into and disconnectable from the seat 216 along the coupling direction T.

A casing 205 of the dosing unit 202 includes a first element 252, for example of cylindrical tubular shape, provided with an internal cavity 253 that is suitable for containing the first end portion 206 of the shaft 203 and a second element 255 that supports and contains the dosing device 250. The cavity 253 is provided with a lower opening 256 for the passage of the joint 10.

The first element 252 and the second element 255 of the casing 205 can be made in a single body.

In a version of the apparatus which is not illustrated in the figures, the first element 252 of the casing 205 includes a connecting wall that has a substantially flat shape. The casing 205 further includes a gripping portion 252a fixed to the first element 252 and shaped as a handle that enables the dosing unit 202 to be easily gripped and handled by an operator.

The coupling device 60 includes a coupling element made directly on a side wall 252c of the first element 252 of the casing 205. Alternatively, the coupling element 60 can be an element that is distinct and fixed to the aforementioned side wall 252c.

In the embodiment illustrated in FIG. 6, the stop assembly 270 locks the shaft 203 to the casing 205 in a preset linear and angular position, so as to maintain the dosing unit 202 in an assembled condition R that is necessary for correct connection to the joint 10 and to prevent free and undesired rotation of the rotor 223 of the dosing device 250.

The stop assembly 270 includes, in particular, a stop pin 277 that is slidingly mounted in a first housing 271, made on the side wall 252c of the first element 252 of the casing 205, and arranged for engaging a second housing 273, made on an external wall 206a of the first end portion 206, at the opening of the seat 216.

The first housing 271 is made at the opening 256 of the cavity 253 adjacent to the coupling element 60 and facing the guide 41.

The second housing 273 includes a hole having dimensions that are substantially equivalent to those of the stop pin 277. The stop pin 277 is movable parallel to the second direction Y, i.e., perpendicular to the first axis W1 and is moved by the driving device 76 of the support device 40 between a retracted position and an extended position. In the retracted position, the stop pin 277 is contained completely in the first housing 271 so as not to interact with the first end portion 206 and to enable the shaft 203 to be moved. In the extended position, the stop pin 277 is inserted into the second housing 273 and prevents the shaft 203 from moving along and rotating around the first axis W1, thus determining the assembled condition R of the dosing unit 202.

A driving pin 275, fixed transversely to the stop pin 277, is engaged by a driving stem 74 of the driving device 76. The driving stem 74 is parallel to the stop pin 277 and is driven by a linear actuating device, including for example, a pneumatic cylinder. The driving stem 74 is provided with a respective radial groove that is suitable for receiving the driving pin 275.

In an embodiment of the dosing unit 202 which is not illustrated in the figures, the first housing 271 is made on a side of the lower cylindrical portion that is opposite the coupling element 60 and opposite the guide 41 to enable an operator to drive the stop pin 277 manually between the extended position and the retracted position and thus lock or unlock the shaft 203 manually. In this embodiment, the second housing 273 is clearly made on the external wall 206a of the first end portion 206 facing the first housing 271.

In a mounting step of the dosing unit 202 to the support device 40, the operator supports the dosing unit 202 in the assembled condition R via the gripping portion 252a and inserts the coupling element 60 inside the guide 41 along the first direction X. As in the embodiment in FIGS. 1-4, with the fixing elements 42, 43 maintained in a retracted position by the respective actuators 44, 45 inside the respective openings 47, 48, the coupling element 60 slides inside the guide 41 until it reaches a final position in which the fixing elements 42, 43, pushed by the respective actuators 44, 45 in a protruding position, abut on the respective coupling notches 62, 63 locking the dosing unit 2 in position in the mounting configuration A.

Sliding the dosing unit 202 downwards also entails inserting the clutch portion 11 of the joint 10 inside the seat 216 of the first end portion 206 to enable subsequent transmission of the rotation movement that is necessary for driving the peristaltic pump 250. For this purpose, the joint 10 is preventively positioned by the second movement mechanism 301 in a preset "zero" or hooking position, depending on the structural and dimensional features of the dosing unit 202. Alternatively, the joint 10 can be arranged at the beginning of the mounting step in a disengaged position, suitably spaced away from the shaft 203.

Subsequently, once the dosing unit 202 has been locked to the support device 40 in the mounting configuration A, the second movement mechanism 301 can be driven so as to move the joint 10 along the second axis W2 until the clutch portion 11 is inserted inside the seat 216 of the first end portion 206. In this step the stop assembly 270, which locks the shaft 203 to the casing 205, enables the shaft 203 to be coupled with the joint 10 with a preset and correct angular adjustment.

Once the clutch portion 11 has been engaged and locked in the seat 216, the stop assembly 270 is disengaged from the shaft 203 to enable the shaft 203 to rotate freely.

Figure 7:
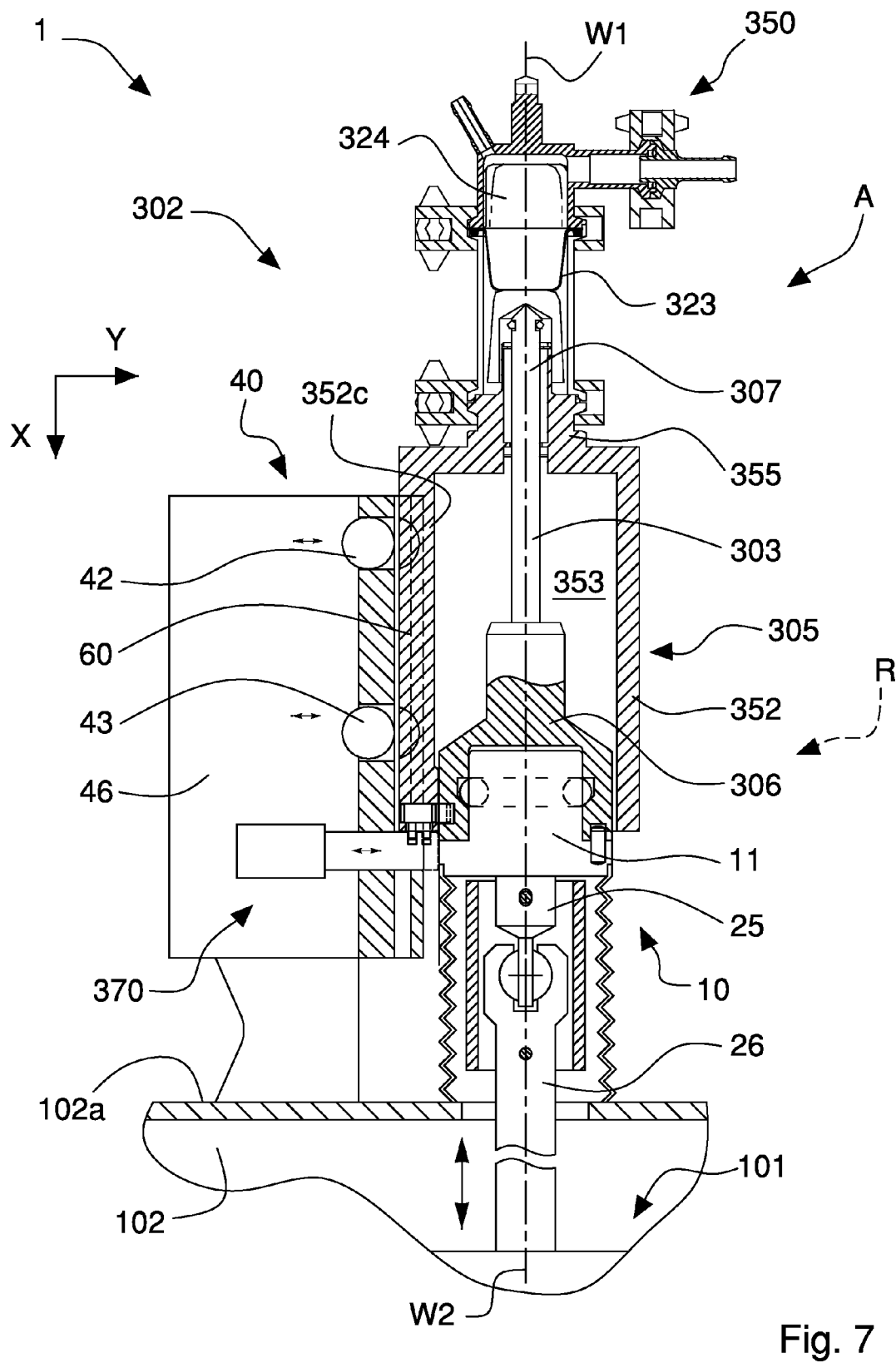
FIG. 7 is a partially sectional front view of a further embodiment of the dosing apparatus.

FIG. 7 illustrates another embodiment of the dosing apparatus 1 of the invention including a dosing unit 302 that includes the dosing device 350 including a membrane or diaphragm pump of known type arranged for dosing fluid products. The membrane pump 350 is driven by an operating assembly 303 including a respective driving shaft that is movable linearly with reciprocating motion along the first axis W1 and is removably connected to the movement mechanism 101 by the joint 10. In particular, the shaft 303 includes a first end portion 306 arranged for removably coupling with the joint 10 and a second end portion 307 that acts on a membrane 323 that closes a side of a dosing chamber 324.

Alternatively, the dosing unit 302 may include a lever and crank system or a cam system to transform a rotating movement provided by the shaft 303 into a reciprocating linear movement. Also in this embodiment, the dosing unit 302 includes a casing 305 including a first element 352 of cylindrical tubular shape that includes a chamber 353 that is suitable for containing the first end portion 306 of the shaft 303 and a second element 355 that supports the dosing device 350.

The coupling device 60 arranged for slidingly engaging in a guide 41 of the support device 40 in the mounting configuration A of the dosing unit 302 is associated with a side wall 352c of the first element 352 of the casing 305.

The dosing unit 302 includes a stop assembly 370 that is substantially identical to the stop assembly 270 of the embodiment disclosed above.

The stop assembly 370 locks the shaft 303 to the casing 305 in a preset linear and angular position to enable the shaft 303 to be connected correctly to the joint 10.

Figure 8:
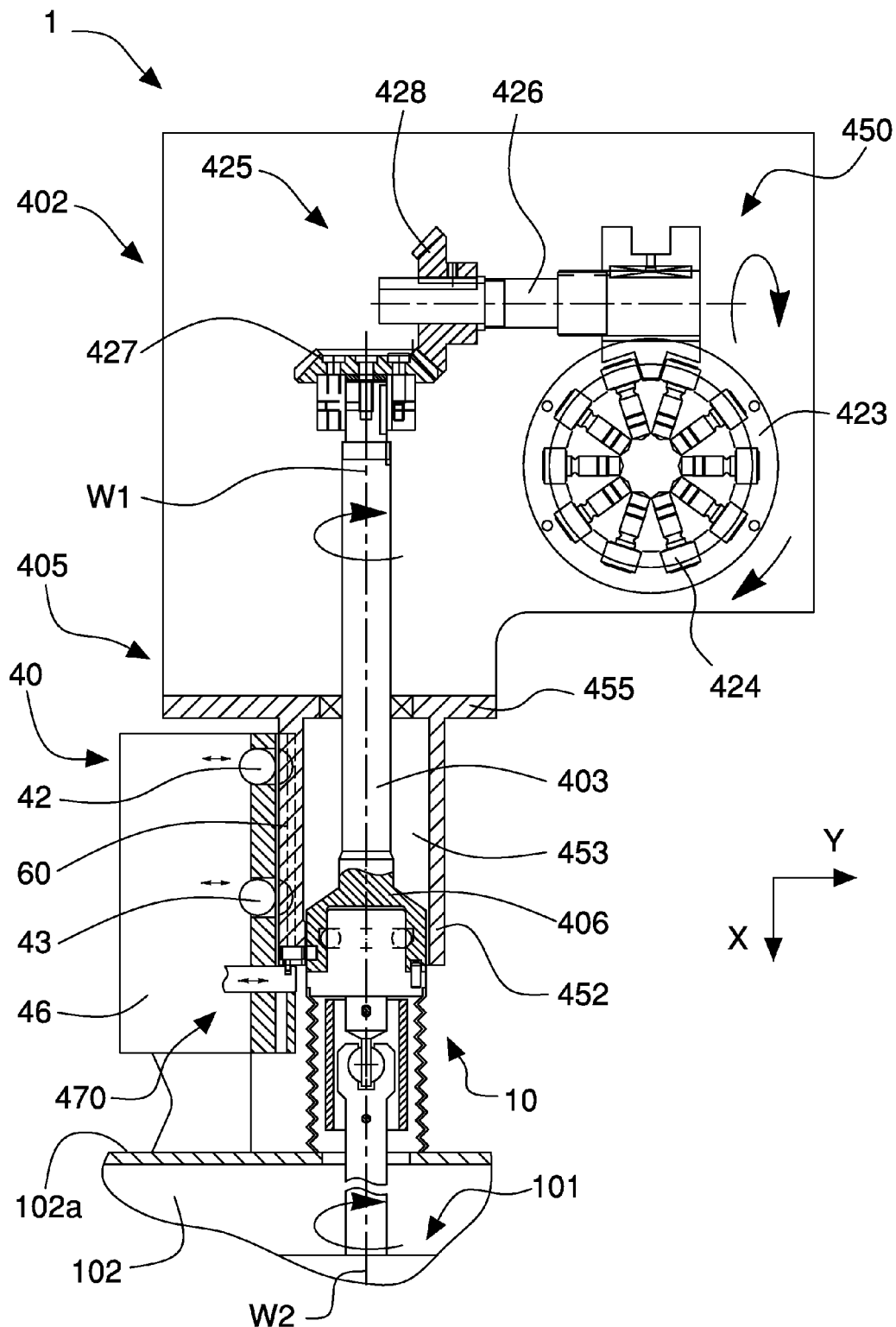
FIG. 8 is a partially sectional front view of another embodiment of the dosing apparatus.

With particular reference to FIG. 8, there is illustrated a further embodiment of the dosing apparatus 1 of the invention that differs from the previously disclosed embodiments through the fact of including a dosing unit 402 provided with a dosing device 450 including a volumetric doser for powder or granule products.

The doser 450, which is of known type and is schematically illustrated in FIG. 8, includes a dosing drum 423 provided with a plurality of radial dosing chambers 424 that are suitable for drawing a powder product from a hopper, not illustrated, and then for releasing the product in the containers.

The dosing drum 423 is rotated by an operating assembly including a driving shaft 403 by a respective transmission arrangement 425. The latter includes a second shaft 426 that rotates the dosing drum 423 and is in turn rotated by the shaft 403 via a pair of bevel gears 427, 428.

The casing 405 includes a first element 452 with which the coupling device 60 is associated and a second element 455 that supports and contains the dosing device 450, i.e. the dosing drum 423 and the respective transmission arrangement 425.

The first element 452 of the casing 405 is, for example, of cylindrical tubular shape and includes a chamber 453 that contains a first end portion 406 of the shaft 403 that is intended for being coupled with the joint 10. The dosing unit 402 includes a stop assembly 470 that is substantially identical to the stop assembly 270, 370 of the versions disclosed above. The stop assembly 470 locks the shaft 403 on the casing 405 in a preset linear and angular position to enable the shaft 403 to be connected correctly to the joint 10.

Figure 9:
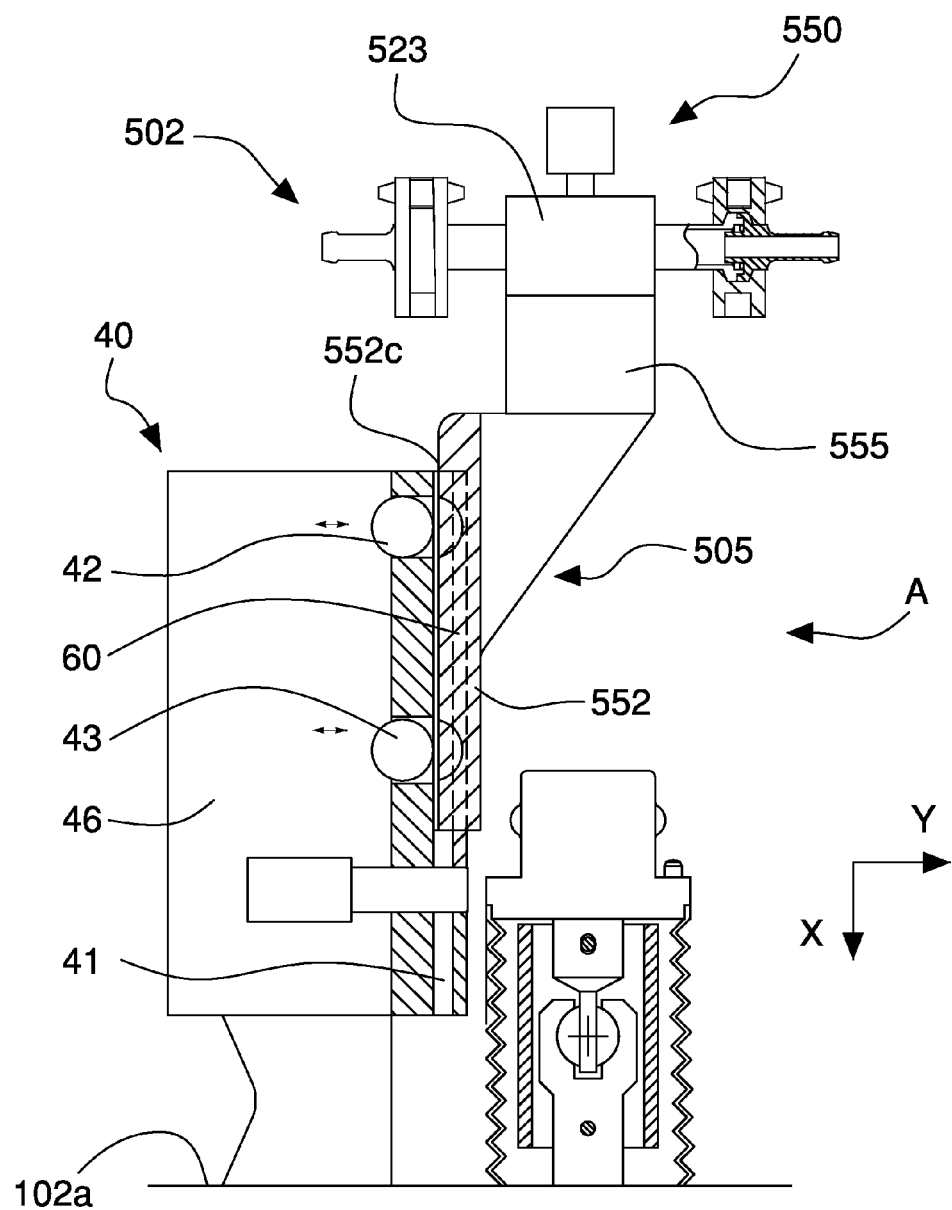
FIG. 9 is a partially sectional front view of another further embodiment of the dosing apparatus.

FIG. 9 illustrates another embodiment of the dosing apparatus 1 of the invention in which the dosing unit 502 includes a dosing device 550 that does not require driving by the movement mechanism (which is not illustrated for this reason). This dosing device includes dosing systems of known type such as for example, dosing systems with time-pressure operation, flow-control dosing systems, flowrate meter dosing systems and the like.

In the embodiment illustrated, the dosing device 550 is of the time-pressure type and in particular includes one or more dosing valves 523 that regulate the flowrate of a fluid to be dispensed in the containers and coming from a pressurized reservoir that is not illustrated. As known, by managing the relation between reservoir pressure and opening time of the dosing valves 523, it is possible to dose set quantities of product.

The dosing unit 502 includes a casing 505 including a first element 552, for example of a substantially flat shape, and a second element 555 to which the dosing valves 523 are fixed. The coupling device 60 arranged for slidingly engaging in a guide 41 of the support device 40 in the mounting configuration A of the dosing unit 502 is fixed to a side wall 552c of the first element 552. The first element 552 and the second element 555 are made, for example, in a single body.

The dosing units that are disclosed above by way of non-limiting example refer to the dosing devices and/or systems that are most commonly used in the pharmaceutical and/or food fields. Nevertheless, it is clear that the dosing apparatus of the invention can include dosing units having any type of dosing device.

The invention claimed is:

1. A dosing apparatus, comprising
    (a) a dosing unit including a casing which contains a dosing device;
    (b) a support device associated with a filling machine for supporting and locking said dosing unit in a mounting configuration, said support device including a guide and a fixing device; and
    (c) a coupling device connected with said casing and movable along a first direction between a first position wherein said coupling device is inserted into said guide and a second position wherein said coupling device is disconnected from said guide, said fixing device locking said coupling device within said guide in the mounting configuration.

2. A dosing apparatus as defined in claim 1, wherein said guide contains a groove having a contoured cross section and which extends parallel to said first direction, said coupling device including a coupling element configured to slide within said groove.

3. A dosing apparatus as defined in claim 2, wherein said coupling device is arranged on a side wall of said casing.

4. A dosing apparatus as defined in claim 1, wherein said casing includes a gripping portion, whereby said dosing unit can be gripped and handled by an operator.

5. A dosing apparatus as defined in claim 1, wherein said coupling device includes coupling notches and said fixing device includes fixing elements connected with said guide and selectively moveable to engage and disengage said coupling notches to lock and release said coupling device relative to said guide, respectively.

6. A dosing apparatus as defined in claim 5, and further comprising a pushing device for pushing said fixing elements within said coupling notches with a predetermined force along a second direction transverse to said first direction.

7. A dosing apparatus as defined in claim 5, wherein said guide contains first and second openings and said fixing device includes a first and second fixing elements inserted in said first and second openings, respectively, one of said openings being configured to allow a respective fixing element to move along said first direction.

8. A dosing apparatus as defined in claim 7, wherein said first and second openings are aligned in said first direction.

9. A dosing apparatus as defined in claim 5, wherein said fixing elements engage annular contact surfaces in respective coupling notches to lock said dosing unit on said support device.

10. A dosing apparatus as defined in claim 1, wherein said dosing device comprises one of a volumetric piston pump, a peristaltic pump, a diaphragm or membrane pump, a time-pressure dosing system, a flow-control dosing system, a flow-rate meter dosing system and a volumetric dosing system for powders and granules.

11. A dosing apparatus as defined in claim 1, wherein said dosing device comprises an operating device moveable at least one of linearly along and rotatably around a first axis, and further comprising a movement mechanism connected with said operating device for driving said operating device.

12. A dosing apparatus as defined in claim 11, wherein said casing contains inlet and outlet openings and said operating device includes a piston movable at least one of linearly along and rotatably around a first axis within a dosing chamber of said casing for drawing a desired quantity of fluid from said inlet opening and directing said quantity of fluid to said outlet opening of said casing.

13. A dosing apparatus as defined in claim 11, wherein said first direction is parallel to said first axis.

14. A dosing apparatus as defined in claim 11, and further comprising a joint for removably connecting a first end portion of said operating device with said movement mechanism.

15. A dosing apparatus as defined in claim 11, wherein said movement mechanism includes at least one of a first movement device for rotating said operating device around said first axis and a second movement device for moving said operating device linearly along said first axis.

16. A dosing apparatus as defined in claim 11, and further comprising a stop for locking said operating device to said casing in a defined linear and angular position and maintaining said dosing unit in an assembled condition.

17. A dosing apparatus as defined in claim 16, wherein said stop includes a stop pin mounted in a first housing of said casing and slidable to engage a second housing of said operating device when said dosing unit is in said assembled condition.

18. A dosing unit for a filling machine, comprising
   (a) a casing; and
   (b) a dosing device arranged in said casing, said dosing device including
      (1) an operating device that is movable at least one of linearly along and rotatable around a first axis; and
      (2) a stop for locking said operating device relative to said casing in a defined linear and angular position and for maintaining said dosing unit in an assembled condition.

19. A dosing unit as defined in claim 18, and further comprising a movement mechanism connected with said operating device for driving said operating device.

20. A dosing unit as defined in claim 18, wherein said operating device is at least partially arranged in cavity within said casing.

21. A dosing unit as defined in claim 18, wherein said stop includes a stop pin mounted in a first housing of said casing and movable to engage a second housing of said operating device when in said assembled condition.

22. A dosing unit as defined in claim 21, and further comprising a support device including a driving device for moving said stop pin, said support device supporting said dosing unit with respect to the filling machine.

23. A dosing unit as defined in claim 22, wherein said stop includes a drive pin connected with said stop pin, said drive pin engaging a drive stem of said driving device in a mounting configuration.

24. A dosing unit as defined in claim 18, wherein said casing contains inlet and outlet openings and said operating device includes a piston movable within a dosing chamber of said casing for drawing a desired quantity of fluid from said inlet and directing said quantity of fluid to said outlet.

25. A dosing unit as defined in claim 18, wherein said operating device includes a shaft connected with a movement device for moving said dosing device at least one of linearly and rotatably.

26. A dosing unit as defined in claim 18, wherein said dosing device comprises one of a volumetric piston pump, a peristaltic pump, a diaphragm or membrane ump, a time-pressure dosing system, a flow-control dosing system, a flow-rate meter dosing system and a volumetric dosing system for powders and granules.

* * * * *